United States Patent [19]

Dechape

[11] Patent Number: 4,550,592
[45] Date of Patent: Nov. 5, 1985

[54] PNEUMATIC GAUGING CIRCUIT

[76] Inventor: Michel L. Dechape, 19963 Schoolhouse Ct., Northville, Mich. 48167

[21] Appl. No.: 607,783

[22] Filed: May 7, 1984

[51] Int. Cl.[4] ............................................. G01B 13/10
[52] U.S. Cl. ...................................... 73/37.5; 73/37.8
[58] Field of Search ............................... 73/37.5, 37.8

[56] References Cited

U.S. PATENT DOCUMENTS

| | | | |
|---|---|---|---|
| 2,266,566 | 12/1941 | Poole | 73/37.5 |
| 2,707,389 | 5/1955 | Fortier | 73/37.5 |
| 2,953,014 | 9/1960 | Emmons | 73/37.8 |
| 3,477,276 | 11/1969 | Fortier | 73/37.5 |
| 3,520,175 | 7/1970 | Sharp et al. | 73/37.8 |
| 3,854,322 | 12/1974 | Wood et al. | 73/37.5 |
| 3,948,082 | 4/1976 | Zumbach et al. | 73/37.5 |
| 4,088,009 | 5/1978 | Fukuda | 73/37.8 |

FOREIGN PATENT DOCUMENTS 280223 1/1952 Switzerland ......................... 73/37.5

OTHER PUBLICATIONS

Founding, Welding, Production Engineering, Oct. 1976, "The Principles and Applications of Pneumatic Gauging" by V. R. Burrows.

Primary Examiner—Tim Miles
Attorney, Agent, or Firm—Hauke and Patalidis

[57] ABSTRACT

A bridge type pneumatic circuit, for pneumatic gauging, having an inlet and two branch passageways through which flow of compressed air from an inlet to an outlet of each branch passageway is controlled by an adjustable orifice. One of the outlets is connected to the nozzle, or nozzles, of an air gauge head, such that the pressure of the air flowing past the corresponding adjustable orifice varies as a function of the distance separating the nozzle from the surface, while the other branch passageway is vented to atmosphere through a calibrated orifice to establish a zero reference. The differential pressure between the passageways downstream of the adjustable control orifices is monitored by a differential pressure transducer to provide a control signal to a measurement display instrument. In the alternative, the outlet of the second branch passageway is also connected to the nozzle, or nozzles of an air gauge head, to effectuate differential measurements.

2 Claims, 3 Drawing Figures

PNEUMATIC GAUGING CIRCUIT

BACKGROUND OF THE INVENTION

The present invention relates to a pneumatic circuit for pneumatic gauging.

As is well known, pneumatic gauging is based on the principle of either measuring the flow of compressed air to a nozzle disposed in close proximity to a workpiece surface, such as to determine the dimensional relationship between the nozzle outlet and the surface, or by measuring back pressure in a chamber through which compressed air is flowing via a restricted orifice, the back pressure being a function of the distance separating a nozzle connected to the chamber from the surface of the workpiece. In order to achieve precise measurements, the pressure of the compressed air flowing into the flow chamber in flow measuring circuits, or flowing into the pressure chamber in back pressure circuits, must be precisely regulated.

In back pressure pneumatic gauging circuits, a pressure gauge zero or datum control is provided by means of an adjustable bleed orifice from the back pressure chamber to atmosphere.

Differential back pressure circuits have been designed for the purpose of decreasing the effect of variations of pressure of the compressed air supplied to the pneumatic circuit, due to poor air pressure regulator performance. Differential back pressure pneumatic circuits consist of two air flow branches from an inlet to separate outlets. The flow of air to the pressure chamber is regulated in each branch by a fixed control orifice, and one of the pressure chambers is connected to the pneumatic gauge nozzle. The other pressure chamber is vented to atmosphere through a variable adjustable orifice providing the zero or datum control. An expansible bellows is connected to each pressure chamber, or a flexible diaphragm separates the two pressure chambers, and the differential motion of the bellows, or the deflection of the diaphragm in one direction or the other, is detected and measured as a function of the difference of pressure in the pressure chambers, which in turn represent the dimensional relationship between the outlet of the air gauge nozzle and the surface of the workpiece. As fluctuations in the supply air pressure due to poor air pressure regulator performance are present in both branches of the circuit, they tend to cancel each other such that relative accuracy of measurements is maintained in spite of slight variations in the supply air pressure.

The measured air pressure is displayed relative to a scale calibrated in dimensional units such as thousandths of an inch or millimeters. The scale is generally vertically disposed on or along a glass tube in air flow responsive circuits and in air pressure responsive circuits utilizing a U-tube manometer as a measurement display instrument. Pointer-dial dimension display instruments may be mechanically connected to the moving portion of the bellows or flexible diaphragm of differential back-pressure circuits, through pivot and lever mechanisms. Although pointer-dial instruments such as Bourdon-tube pressure gauges, diaphragm-type pressure gauges and capsule-type pressure gauge could be used directly connected to the pneumatic circuit pressure chamber, for the sake of convenience the measurement display instrument is remotely located and is either pneumatically connected to the air pressure chamber, or electrically connected to a pressure transducer disposed in communication with the pressure chamber.

In most modern pneumatic gauging systems, the measurement display instrument is electrically driven, even though it may be in the apparently traditional form of a vertical scale instrument. The pressure transducer generally takes the form of a metallic diaphragm, bellows or capsule which, directly or through a series of motion amplifying levers, displaces the input member of a probe such as a piezo resistor, a variable resistor such as a linear potentiometer, or, in the majority of systems, a displacement transducer taking the form of a variable transformer having a movable core for varying the mutual inductance between the primary and secondary windings of the transformer as a function of the displacement of the core. The input member of the displacement transducer displaces the movable core. The primary winding of the transducer transformer is connected across a power supply providing ten volts peak-to-peak, for example, at a predetermined frequency in the range generally of 5 to 10 khz. The amplitude of the signal output voltage across the secondary is a function of the linear displacement of the transformer core. The output signal, after demodulation or rectification and amplification, is applied across a voltmeter, sometimes in the form of a pointer-dial instrument or, more traditionally in pneumatic gauging technology, in the form of a vertical scale instrument imitating a U-tube manometer display or, rarely, across an analog to digital converter for providing a digital display of dimension units. The electronic circuitry providing the excitation voltage to the displacement transducer and the demodulation and amplification of the secondary signal voltage is generally installed in the housing of the remote measurement instrument, and is connected to the transducer via a multi-conductor cable provided with appropriate connectors at each end.

SUMMARY OF THE INVENTION

The present invention provides a pneumatic circuit module for pneumatic gauging, of the differential back pressure type, which is of simple construction, which is in the form of a single metallic block having appropriate air passageways bored therein, on which is mounted a differential pressure transducer of the piezo resistive type providing a signal which is compatible with the signal provided by half-bridge and full-bridge displacement transducers used in the majority of gauging apparatus presently in use in the industry. The invention presents the advantage that pressure measurements are directly converted into electrical signals without the use of moving parts such as bellows, plungers, levers or pivots which introduce parasitical friction and hysteresis in the course of detection of small variations of pressure and, consequently, which result in inaccurate quantitative or qualitive measurements of workpieces.

The present invention has for principal object to provide a single-piece pneumatic circuit module, thus avoiding the complex plumbing of pneumatic circuit units, hitherto available on the market, that generally consist of a multiplicity of flexible and rigid air conduits and connectors to needle valve blocks, inlet fittings and outlet fittings. Another of the objects of the present invention is to provide a pneumatic circuit module for pneumatic gauging and measurements which provides accurate measurements in spite of air pressure variations at the input, thus permitting to utilize at the input of the circuit a relatively low cost air pressure regulator.

The single piece pneumatic circuit module of the invention also provides fast response by minimizing the air volume in the pressure chambers. Furthermore, the location of the variable orifices permits the pneumatic circuit module of the invention to be compatible with any measuring head, or jet air gauge, either for normal or differential measurement. A further object of the invention is to provide a pneumatic circuit module which is compatible with the electrical measurement display instrument normally driven by displacement transducers.

The many objects and advantages of the present invention will become apparent to those skilled in the art when the following description of the best mode contemplated for practicing the invention is read in conjunction with the accompanying drawing, wherein like numerals refer to like or equivalent elements, and in which:

DETAILED DESCRIPTION OF THE PREFERRED EMBODIMENTS

Figure 1:
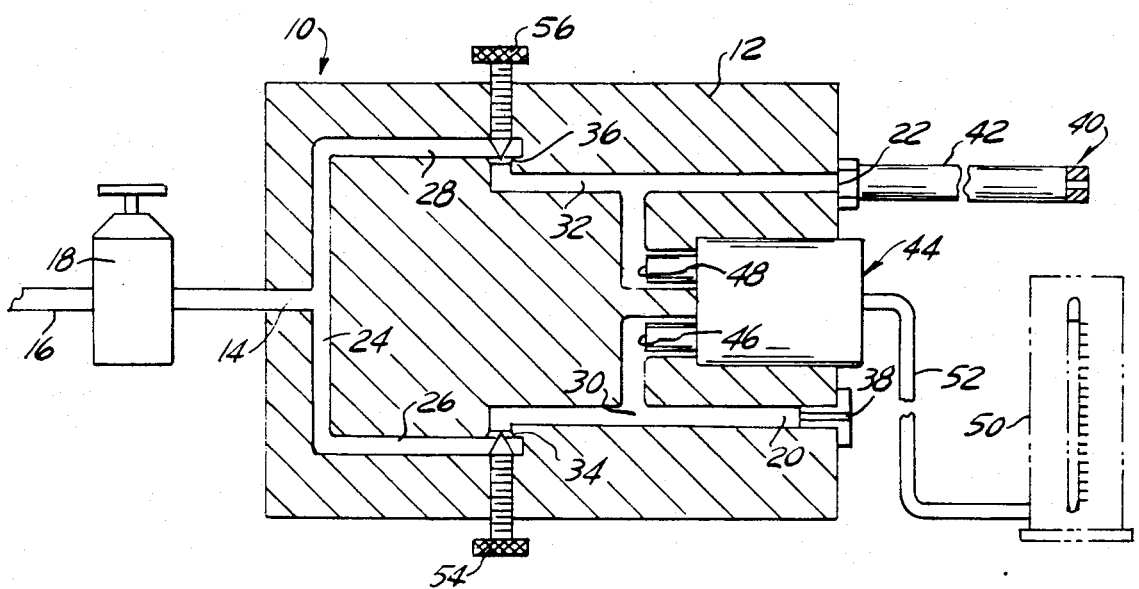
FIG. 1 is a schematic representation of a pneumatic circuit module, according to the present invention, for use in pneumatic gauging.

A pneumatic circuit module 10, according to the present invention, for use in a pneumatic gauging system, takes the form of a single block 12 of non-corrosive material, such as stainless steel, aluminum, or plastic, for example, having an inlet 14 connected to a supply line 16 of compressed air through an air regulator 18, FIG. 1. The block 12 has a plurality of air flow channels or passageways bored therethrough from the air inlet 14 to a pair of air outlets 20 and 22. The air inlet 14 leads into a manifolding channel 24 distributing the air flow to two separate branches 26 and 28 each communicating with a passageway, as shown at 30 and 32, defining a pressure chamber, through an adjustable flow control orifice 34 and 36, respectively. The passageway-pressure chamber 30 is vented to the atmosphere through the outlet 20 provided with a fixed calibrated orifice 38. The passageway-pressure chamber 32 is connected through the outlet 22 to the nozzle, or nozzles, 40 of a jet air gauge head, not shown in detail, such as a twin jet air plug gauge, for example, via a conduit 42.

A differential pressure transducer 44 is mounted on the block 12 such that one of its ports 46 connects to the passageway-pressure chamber 30 while its other port 48 connects to the passageway-pressure chamber 32. The differential pressure transducer 44 which is, for example, of the type available from the Microswitch Division of Minneapolis Honeywell Co. is connected to an electronic measurement instrument 50 through an electric cable 52. The differential pressure transducer 44 consists essentially of a silicon sensor chip on a sensing diaphragm. The sensing diaphragm and four piezo-resistors are integral parts of the chip. The sensing resistors are connected as a four active element bridge providing an output signal which is a function of the pressure differential between the passageway-pressure chambers 30 and 32.

The adjustable control orifice 34, between the branch passageway 26 and the passageway-pressure chamber 30, is adjustable be means of a needle valve 54, while the adjustable control orifice 36 between the branch passageway 28 and the passageway-pressure chamber 32 is adjustable by means of a needle valve 56. Adjustment of the adjustable control orifice 34 provides the zero or datum control as a result of adjusting the pressure in the passageway-pressure chamber 30, while adjustment of the adjustable control orifice 36 by means of the needle valve 56 provides an adjustment of the scale spread, or sensitivity, for the measurement display instrument 50.

Although the passageway through the block 12 are shown at FIG. 1 schematically disposed in a single plane for the sake of clarity, it will be readily appreciated that they may be disposed in different planes within the block 12, which leads to a very compact pneumatic circuit module 10, of very small size.

Figure 2:
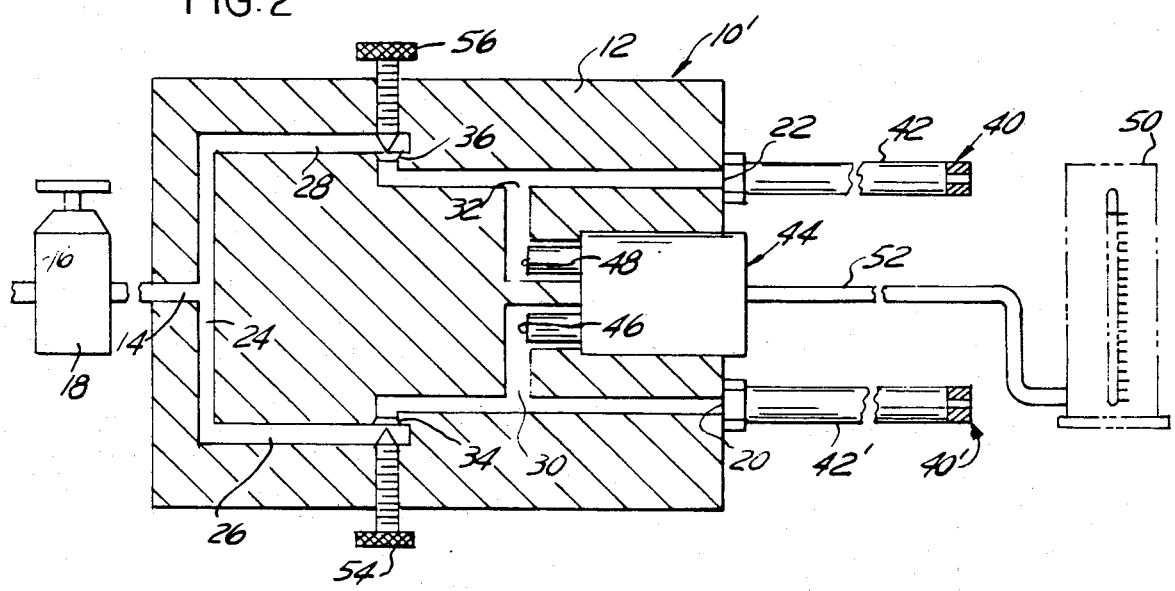
FIG. 2 is a view similar to FIG. 1 but showing a modification thereof.

The pneumatic circuit of FIG. 2 is identical to that of FIG. 1, with the exception of the branch passageway-pressure chamber 30 being placed in communication through the outlet 20 to the nozzle, or nozzles, 40' of a jet air gauge head, via a conduit 42'. The module 10' of FIG. 2 is therefore a dual outlet unit suitable for differential measurements, such as squareness, parallelism, concentricity, ovality, taper, straightness, or barreling of a workpiece, while the single outlet module 10 of FIG. 1 is principally for measurement of inside and outside diameters, thickness, depth, length, and the like. It will also be appreciated that the module 10 of FIG. 1 is readily convertible into the module 10' of FIG. 2 simply by replacing the calibrated orifice fitting 38 at the outlet 20 by an appropriate conventional fitting to which is connected the conduit 42'.

Figure 3:
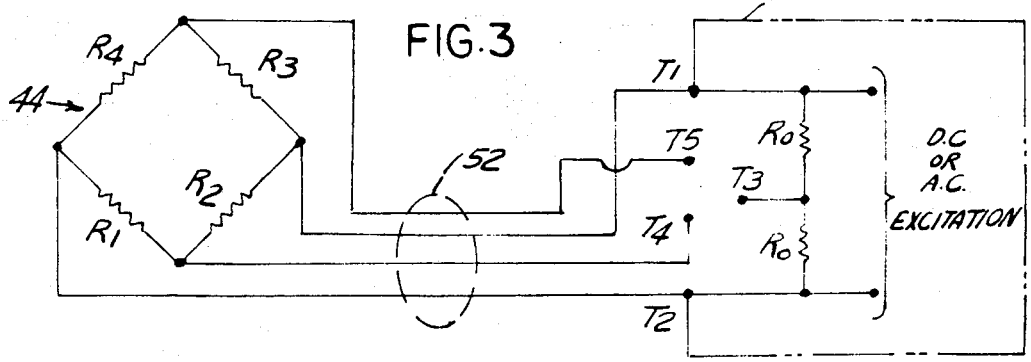
FIG. 3 is a simplified equivalent electrical schematic, useful in explaining the operation of the electrical portion thereof.

The equivalent electrical circuit of the piezo-resistive differential pressure transducer 44 is, as schematically illustrated at FIG. 3, a resistor bridge circuit consisting of variable resistors R1, R2, R3 and R4. Only one-half of the bridge, for example the half bridge consisting of variable resistors R1 and R2, is used, connected as illustrated at FIG. 3, for supplying an input signal to a remote electrical measurement display instrument, adapted to accept an input signal normally provided by a half bridge displacement transducer. In such manner, the pneumatic circuit block of the invention can be used as a direct replacement of pneumatic or electronic gauging circuits presently in the field, and is capable of driving a measurement display instrument normally driven by a displacement transducer, without modification of the electrical circuitry of the instrument.

As schematically illustrated at FIG. 3, the half bridge equivalent circuit of the piezo-resistive differential pressure transducer 44, consisting of equivalent variable resistors R1 and R2, or R3 and R4, is connected through the multi-conductor cable 52 across a DC or, most commonly, an AC electrical "excitation" power source via terminals T1 and T2 of the measurement display instrument, the excitation power source forming part of the circuitry in the instrument and being connected across the terminals T1 and T2 across a pair of equal value resistors Ro. The equivalent variable resistor R1 and R2, or R3 and R4, of the differential pressure transducer 44 have equal resistance values as long as they are subjected to equal stress resulting from equal pressure in the passageway-pressure chamber 30 and 32, FIGS. 1 and 2. However, when the pressures in the passageway-pressure chambers 30 and 32 are no longer the same, the resistance values of the resistors R1 and R2, or R3 and R4, are no longer the same, the bridge becomes imbalanced and the voltage level at the junction between the resistors R1 and R2, or R3 and R4 is no longer one half of the excitation. Consequently, a signal appears across the terminals T3 and T4, or T3 and T5, of the dimension measuring instrument 50. The terminal T3, connected to the junction between the two resistors Ro across the excitation power source, is therefore at one-half of the excitation voltage level. A differential voltage appears across the terminals T3 and T4, or T3 and T5, whose amplitude is a function of the difference in resistance value between the resistors R1 and R2, or R3 and R4, consequently a voltage signal representative of the pressure differential between the passageway-pressure chambers 30 and 32 of FIGS. 1 and 2.

Alternatively, applying a DC voltage "excitation" power source via terminals T1 and T2 and connecting a DC millivoltmeter of the digital type across the terminals T4 and T5 provides a digital deviation indicator which can be calibrated in microns, or other units, using appropriate "masters".

Having thus described the invention by way of examples of structure well designed to accomplish the objects of the invention, modifications whereof will be apparent to those skilled in the art, what is claimed as new is as follows:

I claim:

1. A pneumatic circuit for pneumatic gauging, said pneumatic circuit comprising an inlet to which compressed air is supplied, a first branch passageway connected to said inlet, said first branch passageway having a first outlet, a second branch passageway connected to said inlet, said second branch passageway having a second outlet, a first needle valve adjustable control orifice in said first branch passageway between said inlet and said first outlet defining a first pressure chamber between said first control orifice and said first outlet, a second needle valve adjustable control orifice between said inlet and said second outlet defining a second pressure chamber between said second control orifice and said second outlet, a differential pressure transducer having a first port connected to said first chamber and a second port connected to said second chamber, said differential pressure transducer being adapted to provide an electrical output signal to a measurement display instrument as a function of the pressure differential between said chambers, said first and second adjustable orifices being adjustable for effecting respectively sensitivity and datum scale settings of the measurement display instrument, a first flow orifice connected to said first outlet, and a second flow orifice connected to said second outlet, wherein at least said first flow orifice connected to said first outlet is a variable flow first nozzle whose flow rate is dependent upon the distance separating said first nozzle from a surface causing the pressure of the air circulating in said first chamber to vary as a function of the air flow through said first nozzle and said second flow orifice connected to said second outlet is a calibrated orifice fitting having a fixed area and venting said second pressure chamber to the ambient for effecting measurements by means of said variable flow first nozzle, said calibrated orifice fitting being replaceable by a variable flow second nozzle whose flow rate is dependent upon the distance separating said second nozzle from a surface causing the pressure of the air circulating in said second chamber to vary as a function of the air flow through said second nozzle for effecting differential measurements by means of said variable flow first and second nozzles.

2. The pneumatic circuit of claim 1 further comprising a pressure regulator at said inlet.

* * * * *

UNITED STATES PATENT AND TRADEMARK OFFICE
CERTIFICATE OF CORRECTION

PATENT NO. : 4,550,592
DATED : 8/15/85
INVENTOR(S) : Michel L. Dechape

It is certified that error appears in the above-identified patent and that said Letters Patent are hereby corrected as shown below:

Col. 2, line 56, correct the spelling of "qualitative";

Col. 4, line 3, change "be" to --by--;

Col. 4, line 13, change "passageway" to --passageways--.

Signed and Sealed this

Eleventh Day of February 1986

[SEAL]

Attest:

DONALD J. QUIGG

Attesting Officer

Commissioner of Patents and Trademarks